March 18, 1941.   L. B. VERNON ET AL   2,234,994
ARTICLES FORMED OF THERMOPLASTIC SYNTHETIC RESINS
AND PROCESS OF MANUFACTURING THE SAME
Filed May 20, 1939
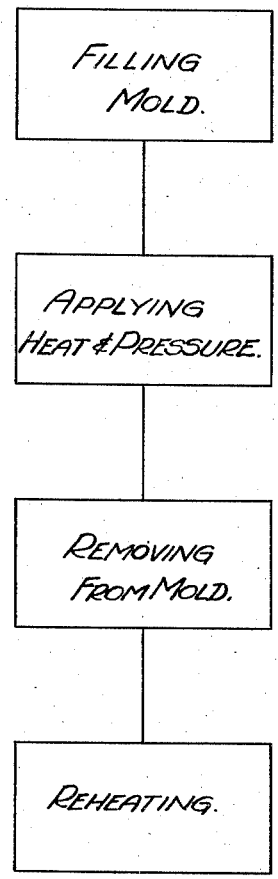
INVENTORS
Lester B. Vernon
Harold M. Vernon
BY
Edward A. Laurence
their ATTORNEY Patented Mar. 18, 1941

2,234,994

UNITED STATES PATENT OFFICE 2,234,994

ARTICLE FORMED OF THERMOPLASTIC SYNTHETIC RESINS AND PROCESS OF MANUFACTURING THE SAME

Lester B. Vernon, Beaver, and Harold M. Vernon, Thornburg, Pa., assignors to The Vernon-Benshoff Company, Pittsburgh, Pa., a corporation of Pennsylvania Application May 20, 1939, Serial No. 274,840

7 Claims. (Cl. 18—47.5)

This application is a continuation in part of our patent application Serial No. 119,870, filed January 9, 1937.

Our invention relates to articles, such for instance as artificial dentures, which are formed of thermoplastic synthetic resins, and to the method of manufacturing the same. Although our invention is particularly adapted to the manufacture of dentures, it also may be advantageously applied to the production of any article or object in connection with which coloration and surface characteristics are important considerations.

For the purposes which we have in view we employ synthetic resins of the thermoplastic type, which when polymerized are characterized by what we term an "elastic memory."

By thermoplastic resins is meant that class of synthetic resinous compounds which soften when heated so as to be workable for shaping and forming purposes, but which do not undergo chemical changes at the softening temperature.

Examples of such resins are those derived from acrylic acid, such as methyl methacrylate, ethyl methacrylate, vinyl chloride, vinyl acetate, and interpolymers thereof. Doubtless there are many other resins possessing this property, but we have successfully used those above mentioned in the practice of our invention.

Such resins when polymerized in any given shape, tend to retain such shape. When heated the shaped resin does not melt but becomes more yielding and rubbery and when sufficient external pressure is applied it may be molded into another shape which it will retain when cool.

Thus if the polymerized resin is in the form of a sphere and is then flattened under heat and pressure, it will retain its flattened form unless reheated sufficiently to restore its rubbery state; when it will tend to reassume its original spherical shape.

This property for convenience we term "elastic memory."

In the accompanying drawing the steps of the process disclosed herein are set forth diagrammatically.

In the practice of our invention we preferably employ thermoplastic resins which have been fully or substantially polymerized and which are in the form of relatively small grains or particles. While we prefer that the resins be reduced to powder or small particles in the polymerizing process so that each grain, however small or large, is spherical in shape, any process may be employed to reduce the resin to particles either during polymerization or after. Thus the polymerized resins may be cut, ground, milled, shaved, shredded or otherwise reduced mechanically, or they may be broken down into particles by chemical means, such as by solution and precipitation. Neither the method of producing the particles nor their exact size and shape are material, so long as the resins are polymerized and in the form of particles which may be poured into the mould. The particles may be any shape or a mixture of a plurality of shapes and they may be irregular as to sizes.

These polymerized grains are poured into a mould or other shaper, and are subjected to sufficient heat and pressure to distort and surface weld them together into a solid non-porous whole having surfaces conforming to the mould cavity of the desired contour; and it will be found that the article produced is composed of a multitude of welded-together particles more or less deformed by the pressure but each maintaining its identity and possessing the property of returning to its original form when reheated free from too great restraining external pressure.

The moulded article appears to the eye to be homogeneous. That is, if properly moulded, it appears that the constituent particles have totally coalesced and fused into one mass. But in reality there has not been a fluid coalescence of the particle substance. There has been only surface adhesion of particle to particle. And since liquefaction has not taken place, each constituent particle has retained its individual identity. They will have been compressed, stretched, flattened or variously distorted as the fortuity of mould outline and of external pressure was imposed upon them, but each particle is still intact as to its original mass and substance. Moreover, it tends to return to its original shape if reheated free from a restraining external pressure.

Thus if such resins are polymerized in the form of beads of different colors and also transparent beads, and the intermingled beads are pressed with heat into a mould, an examination of the article produced, after it has cooled, will reveal that it is composed of the individual beads each retaining its identity and color or transparency, and practically retaining their relative positions, and, while firmly welded together, changed in shape only to the degree resulting from the compressive forces employed in the moulding operation.

The following example is given to illustrate the temperature and pressure requirements for producing a moulded article.

A quantity of a polymerized resin having the property of elastic memory is placed in a mould and is heated to a temperature of from approximately 285° F. to 315° F. and subjected to a pressure of 1500 to 5000 pounds per square inch. The time required for producing the moulded article under these temperatures and pressures depends largely upon the particular resin and the character of the article being produced as is well understood by those skilled in the art.

If a plasticizer is added to facilitate the moulding operation the temperatures and pressures required are reduced as is also well known by those skilled in the art.

Now, if the surface, or a portion of the surface of the moulded article be subjected temporarily to enough heat to again make the resin rubbery, the beads or particles in the affected surface area tend to resume the shapes they had before pressing or the shapes into which they were originally polymerized. Thus, if the article was moulded of spherical grains, and then is heated again after removal from the mould, the whole surface will become pebbly by reason of the fact that the surface grains tend to round up in their former shapes again. Likewise if the resin put into the mould was a powder of very fine grains, the reheated surface will have the appearance of ground or etched glass.

In the case of articles moulded of polymerized particles of thermoplastic synthetic resin which has the property of elastic memory, the individual surface particles may be caused to reassume, to a desired degree, their original shapes by the application of localized heat. This heating may be accomplished in any convenient manner, such as by subjecting the surfaces or a selected portion of a surface or surfaces of the moulded article to dry heat, the heat of an open flame, to a steam jet or atmosphere, or to contact with a heated implement. Again, the article may be immersed or partially immersed to boiling water or other heated liquid. We find that temperature between approximately 140° F. and 240° F. to be satisfactory for this purpose.

Dentists have long recognized that natural oral tissue is not of one flat homogeneous color like a painted surface but that its tone or tinting is made up of many various shades and colors. There are reds, blues, yellows, whites and shades of the same blended in a somewhat translucent tissue. There are tiny points, streaks, veins and lines of different shades and colors noticeable upon close examination, and which are synthetized by the eye into a more or less uniform coloration.

Under the present practice in the manufacturing of artificial dentures the reproduction of such color conditions has been unattainable.

Again, it has long been recognized that natural oral tissue is not glassy or smooth like a polished surface but presents a slightly roughened, pebbly or ridged or rib-grained surface.

Denture manufacturers have attempted to imitate this natural surface but with little success. They have tried stippling the wax base plate, and stippling or tooling the surface of the artificial denture, with very indifferent result.

This natural surface of the denture is not only of importance from the consideration of appearance, but also it is important for masticatory efficiency. In the palatal section of the human mouth and on the lingual surface of the alveolar ridges the slightly pebbled, ridged or reticulated surface of the natural tissue aids in mastication and assists in forming a bolos of the food.

Thus in an artificial denture a surface as nearly as possible reproducing the natural surface of the oral tissue is desired not only for aesthetic reasons but also for practical purposes such as opposing a more nearly normal surface to the tongue.

In manufacturing an artificial denture in accordance with our invention, we mix the grains of polymerized resin of the necessary different colors, or colored grains mixed with transparent grains, or transparent grains, and fill the mass into the mould, and then apply sufficient heat to cause them to assume a rubbery state and sufficient pressure to firmly compress them in the mould so that the particles become welded together and form a denture of the desired shape.

When cooled and removed from the mould the denture presents a close imitation of coloration of the human oral tissue.

We may apply heat to the surface of the denture, or to such portions of the same as may be desired, to raise the temperature of the particles at or adjacent the heated surface sufficiently to cause said particles to assume more or less of their original shapes. We thus obtain a more faithful reproduction of the natural surface of oral tissue.

Or, if no coloration is desired, we may employ transparent resin so that the color of the natural tissue shows through the denture.

If desired, a portion only of the denture may be formed in accordance with our invention, such portion being embedded in or otherwise attached to the body of the denture which may be made of other materials such for instance as resins not possessing the property of elastic memory.

By the use of our invention we are enabled not only to reproduce with great faithfulness the natural coloration of the human oral tissues but also to provide the desirable slightly pebbled, ridged and reticulated surfaces.

It is obvious that the advantages of our invention are not confined to artificial dentures, but our invention may be employed in the production of articles intended for many uses wherein coloration and surface characteristics of the general characters described may be desirable for ornamental or utilitarian reasons.

We claim:

1. The process of finishing a surface of a moulded article formed of synthetic resin having the property of elastic memory which comprises reheating the selected surface area or areas of the article to cause the surface particles to reassume their original shape to the desired degree.

2. The process of producing articles of synthetic resins having the property of elastic memory, which comprises filling a mould with particles of polymerized resin having an elastic memory, applying heat and pressure thereto sufficient to distort and surface weld the particles together into a solid non-porous whole having a surface conforming to the cavity of the mould, removing the molded substance from the mold, and reheating a surface of the moulded article to a temperature sufficient to cause the individual surface particles to reassume their original shape to the desired degree.

3. The process of producing articles of synthetic resins having the property of elastic memory, which comprises filling a mould with particles of polymerized resin having an elastic memory, the particles being selected in accordance with their individual coloration, applying heat and pressure thereto sufficient to distort and surface weld the particles together into a solid non-porous whole conforming to the cavity of the mould, removing the molded substance from the mold, and reheating a surface of the moulded article to a temperature sufficient to cause the individual surface particles to reassume their original shape to the desired degree.

4. The process of producing articles of synthetic resins having the property of elastic memory, which comprises filling a mould with particles of polymerized resin having an elastic memory, applying heat and pressure thereto sufficient to distort and surface weld the particles together into a solid non-porous whole having a surface conforming to the cavity of the mould, removing the molded substance from the mold, and reheating a surface of the moulded article to a temperature of between approximately from 140° F. to 240° F. to cause the individual surface particles to reassume their original shape to the desired degree.

5. The process of producing articles of synthetic resins having the property of elastic memory, which comprises filling a mould with particles of polymerized resin having an elastic memory, the particles being selected in accordance with their individual coloration, applying heat and pressure thereto sufficient to distort and surface weld the particles together into a solid non-porous whole conforming to the cavity of the mold, removing the molded substance from the mold, and reheating a surface of the moulded article to a temperature of approximately between 140° F. to 240° F. to cause the individual surface particles to reassume their original shape to the desired degree.

6. A moulded article formed of particles of polymerized synthetic resin having the property of elastic memory, which particles are distorted from their original shape and surface-welded together into a solid non-porous whole except that the exposed portion of the individual particles at the surface of the article present their original shape to a selected degree.

7. A moulded article formed of variously colored particles of polymerized synthetic resin having the property of elastic memory, which particles are distorted from their original shape and surface-welded together into a solid non-porous whole except that the exposed portion of the individual particles at the surface of the article present their original shape to a selected degree.

LESTER B. VERNON.
HAROLD M. VERNON.